Figure 1:
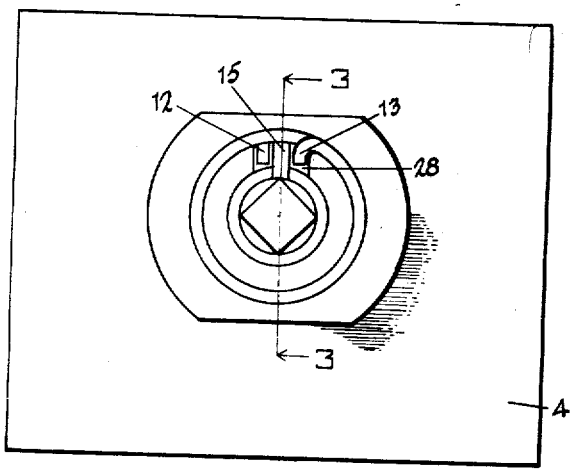

March 1, 1927.

H. A. MYERS

Re. 16,565

CLUTCH DEVICE

Original Filed Nov. 1, 1923

Inventor

Hubert A. Myers.

By Faust F. Crampton

Attorney

Reissued Mar. 1, 1927. Re. 16,565

UNITED STATES PATENT OFFICE.

HUBERT A. MYERS, OF TOLEDO, OHIO.

CLUTCH DEVICE.

Original No. 1,534,804, dated April 21, 1925, Serial No. 672,044, filed November 1, 1923. Application for reissue filed January 19, 1927. Serial No. 162,189.

My invention has for its object to provide a simple clutch mechanism for automatically connecting two parts when one ceases to rotate relative to the other and automatically releasing one from the other when one of the members rotates relative to the other. Although the invention may be used for a variety of purposes it is particularly applicable for interconnecting and disconnecting a rotatable member and a stationary member. It finds a very beneficial use in devices for raising and lowering windows, in moving conveyances, such as automobiles, railroad passenger cars and the like. The invention thus may be embodied in structures that may vary in form and in their details of construction. To illustrate a practical application of the invention I have shown in the drawings a clutch device, and a modification thereof, particularly usable in window lifting devices.

Figure 2:
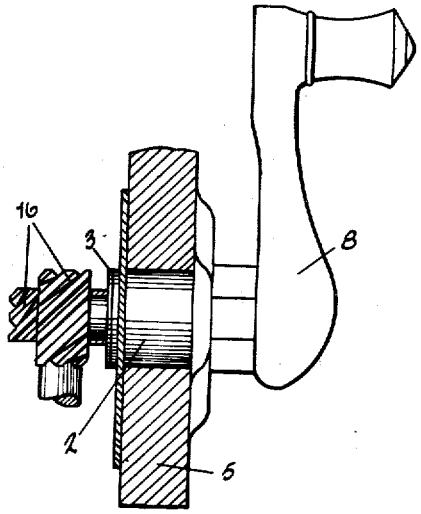
Figure 3:
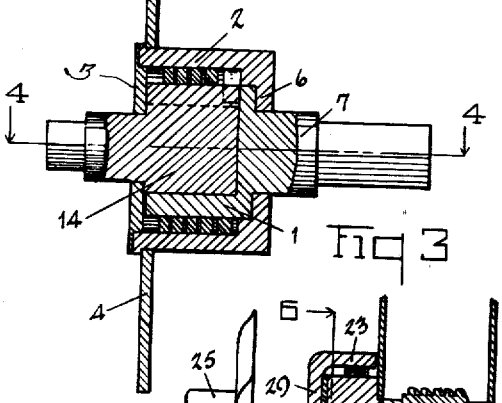
Figure 4:
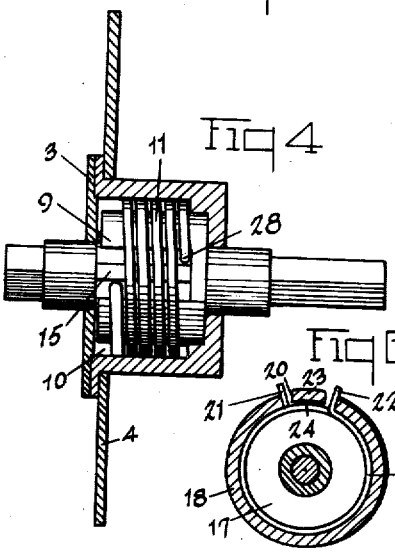
Figure 5:
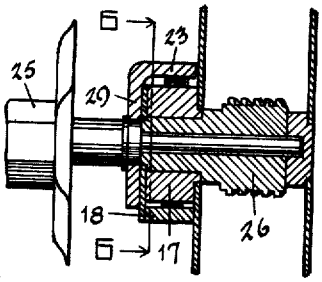
Figure 6:
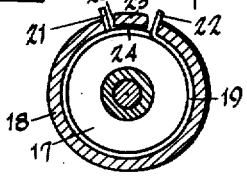

Fig. 1 of the drawing shows an enlarged front view of a clutch containing my invention. Fig. 2 shows a full size view of the clutch and parts that may be connected thereto for the purpose of power transmission. Fig. 3 is a sectional view taken on the line 3—3 indicated in Fig. 1. Fig. 4 is a top and sectional view taken on the line 4—4 indicated in Fig. 3. Fig. 5 illustrates a vertical longitudinal sectional view of the modified form of the clutch and Fig. 6 illustrates a transverse sectional view of the device illustrated in Fig. 5.

Clutches containing my invention are provided with two parts that rotate one relative to the other. In the form shown in the drawings the member 1 is rotatively supported while the member 2 is a stationary member that is secured to a suitable support or fixed part of the structure. In the form shown the member 2 is a cup or shell having a flange 3 and is secured to the supporting plate 4 and to the structural part 5, while the member 1 is rotatably supported and secured within the member 2, such as by the end wall 6 of the cup or shell 2. The member 1 is provided with a hub that extends though the bottom to the shell 2 and a suitable means may be provided, such as the crank handle 8, for rotating the member 1.

The member 2 is provided with an inner cylindrical surface and a spiral spring is inserted in the member 2. The spiral spring is so wound as to elastically grip the surface of the member 2. The member 1 is provided with a means for releasing the spring from engagement with the member 2, whereupon the spring may be rotated with the member 1. Preferably the spring is provided with a means for positively engaging the member 1 so that the spring will be carried with the member 1 when the member 1 is rotated. In the form shown the spring is provided with hooked ends 12 and 13 that are turned inward, since the member 1 is located within the member 2, and consequently the spring will be rotated with the member 1. In order to permit the hooked ends 12 and 13 to be engaged by the member 1, the member 1 may be provided with a suitable recess or recesses into which the hooked ends project, such as the recess or opening 28, and so that upon rotation of the member 1, the end of the spring will be caught and drawn in a direction that would wind the spring on the member 1 and thus release its frictional engagement with the outer member 2. When the member 1 is rotated in the opposite direction the other end of the spring is engaged and similarly drawn in a direction to release it from the member 2. Thus when the member 1 is rotated in either direction, it causes the spring to release its frictional grip on the member 2 and since the spring is positively connected with the member 1, the member 1 will be frictionally held or locked by the spring in the position to which it is turned until a positive force operates upon the member to rotate it. The spring thus automatically clutches the member 2 when the member 1 is stationary and automatically releases from the member 2 when the member 1 is rotated.

A third member is connected to the spring and thus controlled thereby. In the form shown a member 14 is connected to the spring 11 by a lug or key 15 which is located intermediate, the hooked ends 12 and 13 of the spring thus securely connected to the spring. In order to maintain this connection between the member 14 and the spring 11, the member 14 is socketed in the member 1 and the lug or key 15 radially extends from the member 14 and so as to extend within the recess or opening 28 and between the ends of the spring. When, therefore, the spring is rotated the member 14 will be rotated by the pressure of one or the other of the ends of the spring against the flange or key 15 and when the spring is locked the member 14 will be held locked by the spring 11. Thus upon the operation of the member 1, one end of the spring will be engaged to release the spring from the member 2 and continued movement of the member 1 will force that end of the spring against the flange 15 and thus cause rotation of the member 14 and when the member 1 is stationary the member 14 will be held locked by the spring. If a rotating force is applied to the member 14 in either direction the flange or key 15 will press against an end of the spring in a direction that would cause the end of the spring to expand and thus cause it to more tightly grip the member 2.

For convenience and simplicity of the structure the member 1 is provided with the cylindrical surface 9 and the cylindrical surfaces 9 and 10 of the two members 1 and 2 are placed coaxial and in such spaced relation that the spring may be located between them, a slight clearance between the inner surface and the spring being also provided to permit releasement of the spring from the outer surface.

The spring may be of any form and have any desired cross section. Preferably the spring is spirally formed and is square in cross section which gives a large contact area on the spring for frictionally gripping the stationary member.

Also the end of the spring being located between the members 14 and 1, the drive is directly communicated from the member 1 to the member 14. A suitable element or elements for the transmission of the power received by the member 14 may be connected to it. If the clutch is used for securing windows in adjusted positions, suitable window raising and lowering mechanisms may be connected to the member 14. For purpose of illustration I have shown a pair of worm gears that are to be actuated and locked through the clutch and used for power transmission.

The relative location of the parts may be greatly varied since all that is required is to provide a stationary means to be engaged by the spring, a means for releasing the spring and a means for connecting transmission elements to the spring. In the form of structure shown in Figs. 5 and 6 the stationary member is the inner member while the rotatable member is the exterior member. The block 17 is secured to a stationary part of the structure and the shell 18 surrounds the block 17. The block 17 is provided with a cylindrical surface on which the spring 19 is wound so as to elastically and frictionally engage its surface. The spring 19 is also provided with engaging ends. The shell 18 is provided with a slot 20 into which the engaging ends 21 and 22 protrude and are engaged by the edges of the slot 20. Thus the shell 18 is positively engaged by the spring 19 and, since the spring 19 frictionally engages the block 17, the shell 18 is held relative to the block 17 until the spring is released sufficiently to permit rotation of the spring. Means is provided for engaging either end of the spring 19 to move that end of the spring in a direction that would release it, that is, cause it to unwind from the block 17.

The member 23 is located between the protruding ends 21 and 22 of the spring so that when the member 23 is moved in one direction or the other and so as to press against one end or the other of the spring, the spring will be released from the block 17. Continued motion of the member 23 will force the end of the spring, with which it makes contact, against the edge of the recess or opening 24 formed in the shell 18 and cause the shell 18 to rotate. To actuate the member 23, it is connected to a disc 29 which may be connected to the handle 23. When therefore, the handle 25 is rotated the shell 18 will first be released from its connection with the stationary block 17 through the spring 19 and then rotated. Any mechanism that is to be controlled by the clutch may be connected to the shell 18 such as the spiral gear wheel 26.

I claim:

1. In a clutch device, a pair of members, one contained within the other and one rotatable relative to the other, a spring located between the members for normally frictionally engaging one of the members, one of the members having a recess and the spring having its ends located in the recess for positively engaging the said last named member; a third member located within the inner of the said members and having a flange part located in said recess for engaging the ends of the spring, either end of the spring engaging the member having the recess, for releasing the frictional engagement through the spring and rotating the last named member in either direction.

2. In a clutch device, a pair of members, one contained within the other and one rotative relative to the other, a spring located between the members for normally frictionally engaging one of the members, one of the members having a recess and the spring having its ends located in the recess for positively engaging the last named member; a second rotative member located within the inner of the said members and having a part for rotatively connecting the rotative members together and for engaging the ends of the spring, the spring frictionally released by rotation of one of the members, and frictionally locked by the rotation of the other of the rotative members.

3. In a clutch device, a fixed housing, a pair of rotative members located in the housing, a helical spring located within the fixed housing and between the wall of the fixed housing and one of the rotative members, the ends of the spring turned in towards its axis; one of the rotative members for engaging the spring to cause its expansion and frictional engagement with the wall of the fixed housing, the other of the rotative members for contracting the spring, and means interconnecting the rotating members for rotation of one of the members by the other.

4. In a clutch device, a fixed housing, a spring located within the housing for frictionally engaging the wall of the housing, a pair of rotative members located within the housing and adapted to engage the ends of the spring; one of the rotative members for releasing the spring from the housing and the other of the rotative members for locking the spring to the wall of the housing.

5. In a clutch device, a fixed member, a rotatable member located within the fixed member and having a recess, a spring located between the two members and having its ends turned inward towards the axis of rotation of the rotatable member and located in the recess, the rotatable member operating to release the frictional engagement of the spring upon rotation of the rotatable member, a second rotatable member located within the said members, and having a means for engaging either end of the spring and for positively locking the spring against rotation; the said rotative members interconnected for rotating one of the rotative members by rotation of the other of the rotative members.

In witness whereof I have hereunto signed my name to this specification.

HUBERT A. MYERS.

DISCLAIMER

Re. 16,565.—*Hubert A. Myers*, Toledo, Ohio. CLUTCH DEVICE. Patent dated March 1, 1927. Disclaimer filed April 6, 1932, by the assignee, *Myers Regulator Company*.

Hereby enters this disclaimer, disclaiming those parts of the said claims 2 and 4 so as to limit said claims 2 and 4 as here below set forth:

As to claim 2, line 3, before "spring" insert the word *helical;* same line, after "spring" insert *having inturned ends and a plurality of coils and.* Line 5, after "engaging" insert *the inner surface of the outer.*

And so that the said claim 2, when limited by this disclaimer, will read as follows:

"2. In a clutch device, a pair of members, one contained within the other and one rotative relative to the other, a helical spring having inturned ends and a plurality of coils and located between the members for normally frictionally engaging the inner surface of the outer one of the members, one of the members having a recess and the spring having its ends located in the recess for positively engaging the last named member, a second rotative member located within the inner of the said members and having a part for rotatively connecting the rotative members together and for engaging the ends of the spring, the spring frictionally released by rotation of one of the members, and frictionally locked by the rotation of other of the rotative members."

As to claim 4, line 2, before "spring" insert *helical;* same line, after "spring" insert *having inturned ends and a plurality of coils and;* same line, after "for" insert *normally.* Line 3, before "wall" insert *inner surface of the.* Line 5, after "and" insert *one within the other, the outer of the said members having a recess, the edges of the recess.* Line 6, cancel "one" and insert in lieu thereof *the outer.* Line 7, after "housing" insert *upon actuation of the said member.* Line 8, cancel "other" and insert in lieu thereof *inner;* same line, after "members" insert *being rotative relative to the spring and having parts for engaging the inturned ends of the spring.* At the end of the claim insert *and rotatively locking the members together.*

And so that the said claim 4, when limited by this disclaimer, will read as follows:

"4. In a clutch device, a fixed housing, a helical spring having inturned ends and a plurality of coils and located within the housing for normally frictionally engaging the inner surface of the wall of the housing, a pair of rotative members located within the housing and one within the other, the outer of said members having a recess, the edges of the recess adapted to engage the ends of the spring, the outer of the rotative members for releasing the spring from the housing upon actuation of said member, and the inner of the rotative members being rotative relative to the spring and having parts for engaging the inturned ends of the spring for locking the spring to the wall of the housing and for rotatively locking the members together."

(*Official Gazette May 3, 1932.*)